Figure 2:
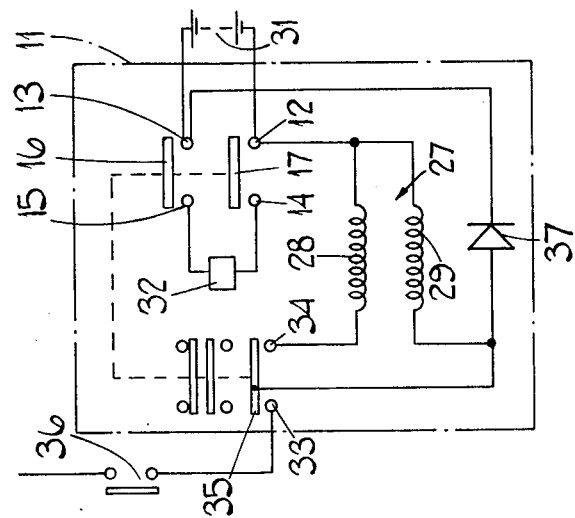

United States Patent [19]

Thornley

[11] 4,144,483
[45] Mar. 13, 1979

[54] ELECTRICAL POLARITY SWITCH FOR BATTERY

[75] Inventor: Derek Thornley, Nelson, England

[73] Assignee: Lucas Industries Limited, Birmingham, England

[21] Appl. No.: 737,706

[22] Filed: Nov. 1, 1976

[30] Foreign Application Priority Data

Nov. 29, 1975 [GB] United Kingdom .............. 49179/75

[51] Int. Cl.$^2$ .............................................. H02J 7/00
[52] U.S. Cl. ...................................... 320/25; 361/245
[58] Field of Search .......................... 320/2, 25, 26, 53; 361/77, 245, 246

[56] References Cited

U.S. PATENT DOCUMENTS

| | | | |
|---|---|---|---|
| 2,509,239 | 5/1950 | Mattheyses | 320/25 |
| 3,308,365 | 3/1967 | St. John | 320/25 |
| 3,349,310 | 10/1967 | Ladoniczki | 320/25 |
| 3,398,347 | 8/1968 | Citro | 320/25 |
| 3,950,688 | 4/1976 | Sancey et al. | 320/2 |

Primary Examiner—Robert J. Hickey

Attorney, Agent, or Firm—Kane, Dalsimer, Kane, Sullivan & Kurucz

[57] ABSTRACT

A switch including an input terminal which is electrically connected in use to one pole of an electric storage battery, an output terminal and a movable contact movable between an inoperative position wherein the movable contact is isolated from at least one of the input and output terminals and a operative position wherein the movable contact electrically interconnects the input and output terminals. An electro-magnet winding is provided which, when energized prevents movement of the movable contact to the operative position and the winding and a semi-conductor diode are connected in series between the input terminal and a further terminal which in use is connected to the other pole of the battery. The diode is so orientated with respect to the intended battery connection polarity that the diode conducts to energize the winding and so prevent movement of the movable contact to its operative position, in the event that reversed polarity connections are made between the battery and the input and further terminals.

10 Claims, 2 Drawing Figures

U.S. Patent

Mar. 13, 1979

4,144,483

ELECTRICAL POLARITY SWITCH FOR BATTERY

This invention relates to an electrical switch, particularly but not exclusively a battery isolating switch for a road vehicle.

A switch according to the invention includes an input terminal which is electrically connected in use to one pole of an electric storage battery, an output terminal and a movable contact movable between an inoperative position wherein the movable contact is isolated from at least one of said input and output terminals and an operative position wherein said movable contact electrically interconnects said input and output terminals, an electro-magnet winding which, when energised prevents movement of said movable contact to said operative position, said winding and a semi-conductor diode being connected in series between said input terminal and a further terminal which in use is connected to the other pole of said battery, said diode being so orientated with respect to the intended battery connection polarity that the diode conducts to energise said winding and so prevent movement of the movable contact to its operative position in the event that reversed polarity connections are made between the battery and said input and further terminals.

Desirably, said switch includes a further input terminal a further output terminal and a further movable contact movable simultaneously with the first mentioned movable contact, the first mentioned input terminal being intended for connection to one pole of said battery in use, and said further input terminal being intended for connection to the other pole of said battery in use.

Conveniently said further terminal is said further input terminal.

Preferably, the switch includes electromagnet means energisable in the operative position of said movable contact(s) to return said movable contact(s) to said inoperative position.

Conveniently said electromagnet means includes said electromagnet winding and a further winding, said windings being energised together to return the movable contact(s) to the inoperative position.

Preferably, the switch includes a set of electrical contacts which is closed in the operative position of the movable contact(s) and which is open in said inoperative position, said electromagnet means being energisable by way of said contacts so that said electromagnet means is only capable of energisation in said operative position of said movable contact(s).

The invention further resides in an electrical switch comprising, a positive input terminal for connection to the positive pole of a battery, a negative input terminal for connection to the negative pole of the battery, a positive output terminal a negative output terminal, a first bridging member movable between an inoperative position wherein the member is isolated from at least one of said positive input and output terminals to an operative position wherein said member electrically interconnects said positive input and output terminals, a second bridging member movable with said first member between an inoperative position wherein said second member is isolated from at least one of said negative input and output terminals and an operative position wherein said second member electrically interconnects said negative input and output terminals, a set of electrical contacts arranged to be open in the inoperative position to the bridging members and closed in the operative position of the bridging members, an electromagnet which when energised causes return of the movable contacts from the operative position to the inoperative position the electromagnet including a winding which when energised will prevent movement of the movable contacts to the operative position from the inoperative position, the electromagnet being energisable by way of said set of contacts and so being capable of energisation only in the operative position of said movable contacts and said positive and negative input terminals being bridged by said winding and a semiconductor diode in series, said diode being orientated with its anode connected to the negative input terminal and its cathode connected to the positive input terminal so as to be non-conductive when the positive and negative input terminals are correctly connected to the battery, but conductive should the polarity of the battery connections be reversed in use so that in the event of the input terminals being connected to the battery with reverse polarity said winding will be energised preventing movement of the movable contacts to the operative position.

Figure 1:
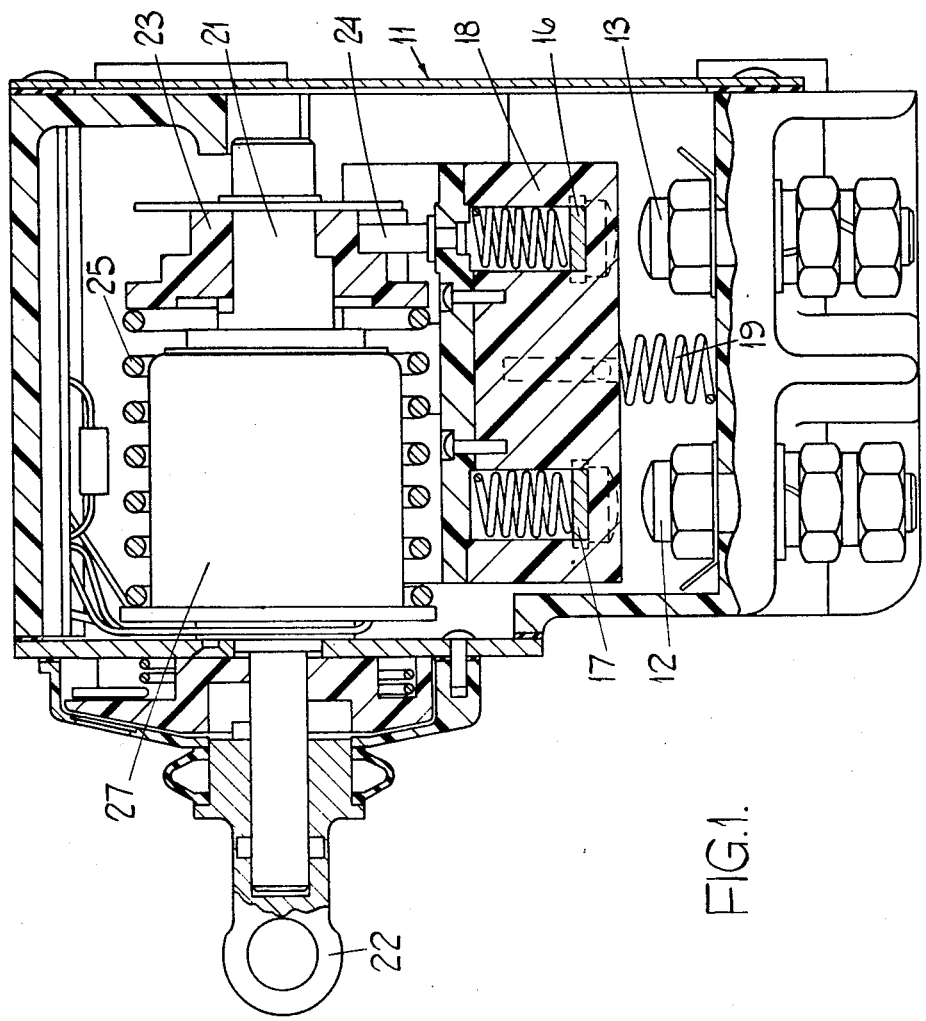

One example of the invention is illustrated in the accompanying drawings wherein FIG. 1 is a sectional view of a battery isolating switch, and FIG. 2, is a circuit diagram illustrating the switch and ancillary components in a vehicle electric system, the switch being shown withn the broken line boundary in FIG. 2.

Referring to the drawings, the electrical switch includes a hollow housing 11, within which are disposed a pair of input fixed contacts 12, 13 and a pair of output fixed contacts 14, 15 the contacts 12–15 each incorporating an integral terminal extending from the exterior of the housing 11. The four fixed contacts 12–15 lie generally in a common plane and associated with the contacts 13,15 is a first conductive bridge piece 16. A second conductive bridge piece 17 is associated with the contacts 12,14 and the bridge pieces 16,17 are carried by a common carrier 18, movable towards and away from the contacts 12–15 and spring urged by a compression spring 19 in a direction away from the contacts. The carrier 18 can be moved against the action of the spring 19 to a position such that the bridge piece 17 bridges, and thus electrically interconnects the contacts 12, 14 while the bridge piece 16 simultaneously interconnects the contacts 13, 15.

The mechanism for moving the carrier 18 relative to the contact 12–15 includes a spindle 21 which extends from the housing 11 and carries an operating handle 22 at its free end. Within the housing 11 the spindle 21 carries a spiral cam 23, the axis of the spindle 21 and thus the axis of rotation of the cam 23 lying parallel to the plane of the carrier 18. The cam 23 has a cam form thereon which is both spiral and helical. Thus the part of the cam form of least diameter is adjacent one axial end of the cam while the part of the cam form of greatest diameter is adjacent the opposite axial end of the cam. A cam follower 24 engages the cam form and a compression spring 25 urges the part of the spindle 21 carrying the cam form 23 axially in a direction to move the part of the cam form of larger diameter towards the cam follower 24. However, such movement of the cam 23 under the action of the spring 25 is resisted by the engagement of the cam follower 24 with the cam form, it being necessary to rotate the cam 23 so that the following 24 follows the helical, spiral cam form in order for the cam 23 to move axially under the action of the spring 25.

It will be recognised that when the carrier 18 is in an inoperative position, that is to say with the bridging members 16, 17 spaced from their respective fixed contacts, then the cam follower 24 is engaged with the portion of the cam of smaller diameter and in order to move the carrier 18 to an operative position wherein the bridging members 16, 17 bridge their respective contacts it is necessary to rotate the handle 22 thus rotating the spindle 21 and the cam 23. Rotation of the cam 23 causes the cam follower 24 to ride on increasingly larger diameter regions of the cam as the cam is moved axially by the spring 25, the movement of the cam follower 24, radially outwardly with respect to the spindle 21 thus moving the carrier 18 towards the contacts 12–15. The spindle 21 can be moved axially by pulling the handle 22 to withdraw the cam 23 against the action of the spring 25 so that the cam follower 24 is returned to the portion of the cam 23 of smaller diameter without rotation of the cam. Thus in an emergency where it is required to break the electrical circuit between the contacts 13, 15 and 12, 14 it is merely necessary to pull the hand, and it is not necessary to rotate the handle. However, in order to complete the circuits it is of course necessary to rotate the handle so that the cam rotates relative to the cam follower.

In the present arrangement in order to provide the facility for electrical cancellation of the switch from its operative to its inoperative state an electromagnet 27 is incorporated into the spindle assembly. The electromagnet when energised draws spindle 21 axially against the action of the spring 25, and thus will return the contact carrier 18 from its operative to its inoperative position without rotation of the cam 23.

The electromagnet 27 includes a pull winding 28 and a hold winding 29 both of which are energised to move the cam 23 against the action of the spring 25, however the hold winding 29 is such that when energised sufficient force is exerted on the spindle to hold the cam 23 against the action of the spring 25. Thus in the event that the winding 29 is energised alone then rotation of the handle 22 will cause rotation of the cam 23, but the cam 23 will not be able to move axially under the action of the spring 25 and so the follower 24 will continue to ride on the part of the cam 23 of smaller diameter and the contacts 18 will never be closed. In practice a stop is incorporated on the cam, which prevents continued rotation of the cam relative to the follower 24 in the event that the cam is held against axial movment.

The electrical arrangement of the switch is as follows. The input contact 13 is intended for connection to the positive pole of a vehicle battery 31 and the input contact 12 is intended for connection to the negative pole of the battery. The output contacts 15, 14 are intended to have the various electrical loads of the vehicle connected across them, these loads being indicated in the drawing by the single load 32. In practice the whole of the electrical system of the vehicle will be across the contacts 14, 15 so that when the bridge pieces 16, 17 are in their inoperative position the battery 31 is isolated from the electrical system of the vehicle.

A further pair of fixed contacts 33, 34 are carried by the housing 11, and are bridgable by a further bridge piece 35 also carried by the carrier 18. The bridge piece 35 bridges the contacts 33, 34 when the bridge pieces 16, 17 are in their operative positions and similarly, the contacts 33, 34 are isolated from one another when the bridge pieces 16, 17 are in their inoperative positions. The contact 33 is connected to a terminal on the wall of the housing 11 which terminal is in turn connected through a normally open manually operable switch 36 in the drivers compartment of the vehicle to some point in the vehicle electrical system fed from the contact 15. The windings 28, 29 are each connected at one end to the contents 12 and the winding 28 is connected at the other end to the contact 34. The other end of the winding 29 is connected to the anode of a semiconductor diode 37 the cathode of which is connected to the contact 13. The other end of the winding 29 is additionally connected to the bridge piece 35.

It will be recognised that if the contact 13 is correctly connected to the positive pole of the battery 31, and the contact 12 is correctly connected to the negative pole of the battery 21, then the diode 37 will block current flow between the terminals 12, 13 by way of the winding 29. However, in the event that the polarity connections are inadvertently reversed and the contact 12 is connected to the positive pole of the battery and the contact 13 is connected to the negative pole of the battery then the diode 37 will conduct and current will flow in the winding 29. As stated above, when energised the winding 29 exerts sufficient force on the spindle 21 to prevent the cam 23 moving under the action of the spring 25 as the spindle is rotated. Thus if the polarity of the input contacts is inadvertently reversed the contact carrier 18 cannot be moved to its operative position and thus the bridge pieces 16, 17 cannot be moved to bridge their respective contacts 13, 15 and 12, 14. Thus the switch cannot be closed to supply the loads 32 in a reversed polarity mode.

Assuming that the polarity connections to the contacts 12, 13 are correct, and that the switch is in a closed condition wherein the bridge piece 16 bridges contacts 13, 15, the bridge piece 17 bridges contacts 12, 14 and the bridge piece 35 bridges contacts 34, 35 then it will be recognised that closure of the switch 36 will energise the winding 28 and the winding 29 simultaneously, and as stated above the force generated by energisation of both windings is sufficient to withdraw the cam 23 against the action of the spring 25 to cause the contact carrier 18 to return under the action of the spring 19 to its inoperative position, breaking the circuits between the contacts 13, 15 and 12, 14 and isolating the battery 31 from the electrical system of the vehicle. Immediately the carrier 18 is returned to its inoperative position the circuits of the windings 28, 29 will of course be broken by movement of the bridge piece 35 to its inoperative position, regardless of whether or not the switch 36 is maintained closed. Similarly, of course, the supply to the switch 36 will be derived from the contact 15 and the supply to the contact 15 will be broken by movement of the bridge piece 16 to its inoperative position.

It will be understood that an arrangement utilising a single winding in place of the pull and hold windings is possible. However, it is preferred to utilize separate pull and hold windings as described above so that the current drain is minimised in the event that a reverse connection is made but not realized until some time later when for example an attempt is made to close the switch.

I claim:

1. An electrical switch including an input terminal which is electrically connected in use to one pole of an electric storage battery, an output terminal and a movable contact movable between an inoperative position wherein the movable contact is isolated from at least one of said input and output terminals and an operative position wherein said movable contact electrically interconnects said input and output terminals, an electromagnet winding which, when energized prevents movement of said movable contact to said operative position, said winding and a semi-conductor diode being connected in series between said input terminal and a further terminal which in use is connected to the other pole of said battery, said diode being so orientated with respect to the intended battery connection polarity that the diode conducts to energize said winding and so prevent movement of the movable contact to its operative position in the event that reversed polarity connections are made between the battery and said input and further terminals, an electromagnetic means energizable in the operative position of said movable contact to return said movable contact to said inoperative position.

2. The invention in accordance with claim 1 wherein said electromagnetic means includes said electromagnet winding and a further winding, said windings being energized together to return the movable contact to the inoperative position.

3. The invention in accordance with claim 1 including a set of electrical contacts which is closed in the operative position of the movable contact and which is open in said inoperative position, said electromagnetic means being energizable by way of said contacts so that said electromagnetic means is only capable of energization in said operative position of said movable contacts.

4. An electrical switch including an input terminal which in use is electrically connected to one pole of an electric storage battery, an output terminal which in use is electrically connected to a load to be energized by said battery, a movable contact movable between an operative position wherein the movable contact completes an electrical circuit between the input terminal and the output terminal, and an inoperative position wherein the movable contact is isolated from at least one of said input and output terminals, and, a cam movable manually to move the movable contact from its inoperative position to its operative position, there being an electro-magnet winding which, when energized, prevents the cam operating on the movable contact to move the movable contact to its operative position, said winding and a semi-conductor diode being connected electrically in series between said input terminal and a further terminal, the further terminal, in use, being connected to the other pole of said battery, said diode being so oriented with respect to the intended polarity of the connection between the battery poles and the input and said further terminals, that the diode conducts to energize said winding in the event that reverse polarity connections are made betwen the battery poles and said input and said further terminals so preventing the cam moving the movable contact to its operative position in the event of such reverse polarity connections.

5. The invention in accordance with claim 4, including a further input terminal, a further output terminal and a further movable contact movable simultaneously with the first mentioned movable contact, the first mentioned input terminal being intended for connection to one pole of said battery in use, and said further input terminal being intended for connection to the other pole of said battery in use.

6. The invention in accordance with claim 5 wherein said further terminal is said further input terminal.

7. The invention in accordance with claim 4 including electromagnetic means energizable in the operative position of each said movable contact to move said cam in a manner to return each said movable contact to said inoperative position.

8. The invention in accordance with claim 7 wherein said electro-magnet means includes said electromagnet winding and a further winding, said windings being energized together to return each movable contact to the inoperative position.

9. The invention in accordance with claim 4 including a set of electrical contacts which is closed in the operative position of each movable contact and which is open in the said inoperative position, said electromagnet means being energizable by way of said contacts so that said electro-magnet means is only capable of energization in said operative position of each said movable contact.

10. An electrical switch comprising, positive input terminal for connection to the positive pole of a battery, a negative input terminal for connection to the negative pole of the battery, a positive output terminal a negative output terminal, a first bridging member movable between an inoperative position wherein the member is isolated from at least one of said positive input and output terminals to an operative position wherein said member electrically interconnects said positive input and output terminals, a second bridging member movable with said first member between an inoperative position wherein said second member is isolated from at least one of said negative input and output terminals and an operative position wherein said second member electrically interconnects said negative input and output terminals, a set of electrical contacts arranged to be open in the inoperative position to the bridging members and closed in the operative position of the bridging members, an electromagnet which when energised causes return of the movable contacts from the operative position to the inoperative position the electromagnet including a winding which when energised will prevent movement of the movable contacts to the operative position from the inoperative position, the electromagnet being energisable by way of said set of contacts and so being capable of energisation only in the operative position of said movable contacts and said positive and negative input terminals being bridged by said winding and a semiconductor diode in series, said diode being oriented with its anode connected to the negative input terminal and its cathode connected to the positive input terminal so as to be non-conductive when the positive and negative input terminals are correctly connected to the battery, but conductive should the polarity of the battery connections be reversed in use so that in the event of the input terminals being connected to the battery with reverse polarity said winding will be energised preventing movement of the movable contacts to the operative position.

* * * * *